US012620726B2

(12) United States Patent
Yamada et al.

(10) Patent No.: US 12,620,726 B2

(45) Date of Patent: May 5, 2026

(54) ANTENNA MODULE AND COMMUNICATION DEVICE EQUIPPED THEREWITH

(71) Applicant: Murata Manufacturing Co., Ltd., Nagaokakyo (JP)

(72) Inventors: Yoshiki Yamada, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 54 days.

(21) Appl. No.: 18/595,441

(22) Filed: Mar. 5, 2024

(65) Prior Publication Data

US 2024/0204424 A1 Jun. 20, 2024

Related U.S. Application Data

(63) Continuation of application No. PCT/JP2022/030091, filed on Aug. 5, 2022.

(30) Foreign Application Priority Data

Sep. 9, 2021 (JP) ................................ 2021-146761

(51) Int. Cl.
*H01Q 21/28* (2006.01)
*H01Q 5/42* (2015.01)

(52) U.S. Cl.
CPC ............... *H01Q 21/28* (2013.01); *H01Q 5/42* (2015.01)

(58) Field of Classification Search
CPC ............ H01Q 1/38; H01Q 1/42; H01Q 1/243; H01Q 1/523; H01Q 5/42; H01Q 9/0407;
(Continued)

(56) References Cited

U.S. PATENT DOCUMENTS 10,804,597 B2 * 10/2020 Xia ...................... H01Q 21/065
11,088,468 B2 * 8/2021 Joung .................... H01Q 1/523
(Continued)

FOREIGN PATENT DOCUMENTS

JP 2021-016198 A 2/2021
WO 2018/230475 A1 12/2018
(Continued)

OTHER PUBLICATIONS

International Search Report and Written Opinion mailed on Oct. 25, 2022, received for International Patent Application No. PCT/JP2022/030091, filed on Aug. 5, 2022, 08 pages including English Translation.

*Primary Examiner* — Tung X Le
(74) *Attorney, Agent, or Firm* — XSENSUS LLP

(57) ABSTRACT

An antenna module including dielectric electrodes whose normal directions are different from each other, emitting elements and a ground electrode disposed on the dielectric substrate, and emitting elements disposed on the dielectric substrate. The emitting element is capable of emitting radio waves of a first frequency band. The emitting element is disposed adjacent to the emitting element and is capable of emitting radio waves of a second frequency band higher than the first frequency band. On the dielectric substrate, the emitting element is disposed at a position that is closer to the dielectric substrate than the emitting element is. The distance from the center of the emitting element to an end surface of the ground electrode that is closer to the dielectric substrate is shorter than the distance from the center of the emitting element to an end surface of the ground electrode that is farther from the dielectric substrate.

20 Claims, 7 Drawing Sheets

(58) Field of Classification Search
CPC .... H01Q 9/0485; H01Q 21/06; H01Q 21/065; H01Q 21/24; H01Q 21/28; H01Q 23/00
See application file for complete search history.

(56) References Cited

U.S. PATENT DOCUMENTS

| | | | | |
|---|---|---|---|---|
| 11,670,837 | B2 * | 6/2023 | Wu | H01Q 9/42<br>343/702 |
| 2014/0203960 | A1 * | 7/2014 | Huang | G01S 7/034<br>342/175 |
| 2021/0083380 | A1 * | 3/2021 | Takayama | H01Q 5/28 |
| 2022/0131281 | A1 * | 4/2022 | Shah | H01Q 25/00 |
| 2023/0030798 | A1 * | 2/2023 | Chen | H01Q 9/0414 |
| 2024/0047881 | A1 * | 2/2024 | Sugahara | H01Q 5/42 |

FOREIGN PATENT DOCUMENTS

| | | | |
|---|---|---|---|
| WO | 2020/170722 | A1 | 8/2020 |
| WO | 2020/261807 | A1 | 12/2020 |
| WO | 2020/261920 | A1 | 12/2020 |
| WO | 2021/038965 | A1 | 3/2021 |

* cited by examiner

ANTENNA MODULE AND COMMUNICATION DEVICE EQUIPPED THEREWITH

CROSS-REFERENCE TO RELATED APPLICATIONS

This is a continuation application of PCT/JP2022/030091, filed on Aug. 5, 2022, designating the United States of America, which is based on and claims priority to Japanese Patent Application No. JP 2021-146761 filed on Sep. 9, 2021. The entire contents of the above-identified applications, including the specifications, drawings and claims, are incorporated herein by reference in their entirety.

TECHNICAL FIELD

The present disclosure relates to an antenna module and a communication device equipped therewith, and more specifically to technology for improving the directivity of an antenna module capable of emitting radio waves in two directions.

BACKGROUND ART

International Publication No. 2020/170722 (Patent Document 1) discloses an antenna module in which emitting elements are disposed on two surfaces of a dielectric substrate having a flat plate-like shape folded into a substantially L shape, the two surfaces having different normal directions. In the antenna module disclosed in Patent Document 1, radio waves can be emitted in different directions from the emitting elements on the respective surfaces of the dielectric substrate.

CITATION LIST

Patent Document

Patent Document 1: International Publication No. 2020/170722

SUMMARY OF DISCLOSURE

Technical Problem

Antenna modules as described above may be used in mobile communication devices such as, typically, cellular phones or smartphones. In recent years, such mobile communication devices have been communicating using radio waves of a plurality of frequency bands corresponding to different communication standards. In this case, emitting elements corresponding to the individual frequency bands are disposed on the individual surfaces of the dielectric substrate.

In a case where the emitting elements corresponding to different frequency bands are disposed adjacent to each other on the individual surfaces of the dielectric substrate, the emitting elements are disposed in the limited space of the dielectric substrate, which may lead to a state where the emitting elements are disposed at a high density. Depending on the positions of the emitting elements on the dielectric substrate, the directions of emission of radio waves may be tilted toward another dielectric substrate, and this may result in a narrower possible emission range for the entire antenna module.

The present disclosure has been made to solve such a problem, and a purpose of the present disclosure is to increase, for an antenna module capable of emitting radio waves in two different directions, the possible emission range of the entire antenna module.

Solution to Problem

An antenna module according to the present disclosure includes a first substrate and a second substrate, whose normal directions are different from each other, a first emitting element and a second emitting element, which are disposed on the first substrate, a ground electrode, and a third emitting element, which is disposed on the second substrate. The first emitting element is capable of emitting radio waves of a first frequency band. The second emitting element is disposed adjacent to the first emitting element on the first substrate, and is capable of emitting radio waves of a second frequency band higher than the first frequency band. The ground electrode is disposed on the first substrate so as to face the first emitting element and the second emitting element. On the first substrate, the first emitting element is disposed at a position that is closer to the second substrate than the second emitting element is. A distance from a center of the first emitting element to an end surface of the ground electrode that is closer to the second substrate is shorter than a distance from the center of the first emitting element to an end surface of the ground electrode that is farther from the second substrate.

Advantageous Effects of Disclosure

According to an antenna module according to the present disclosure, on a first substrate side, an emitting element for a lower frequency band is disposed at a position that is closer to a second substrate than an emitting element for a higher frequency band is, and furthermore, the distance from the center of the first emitting element to an end surface of a ground electrode that is closer to the second substrate is shorter than the distance from the center of the first emitting element to an end surface of the ground electrode that is farther from the second substrate. With such a configuration, the direction of emission of radio waves from the emitting element for the lower frequency band is tilted toward the opposite direction from the second substrate. This reduces a region where radio waves from the emitting elements disposed on the first substrate and radio waves emitted from the emitting element on the second substrate side overlap each other. This can increase the possible emission range of the entire antenna module.

DESCRIPTION OF EMBODIMENTS

Figure 1:
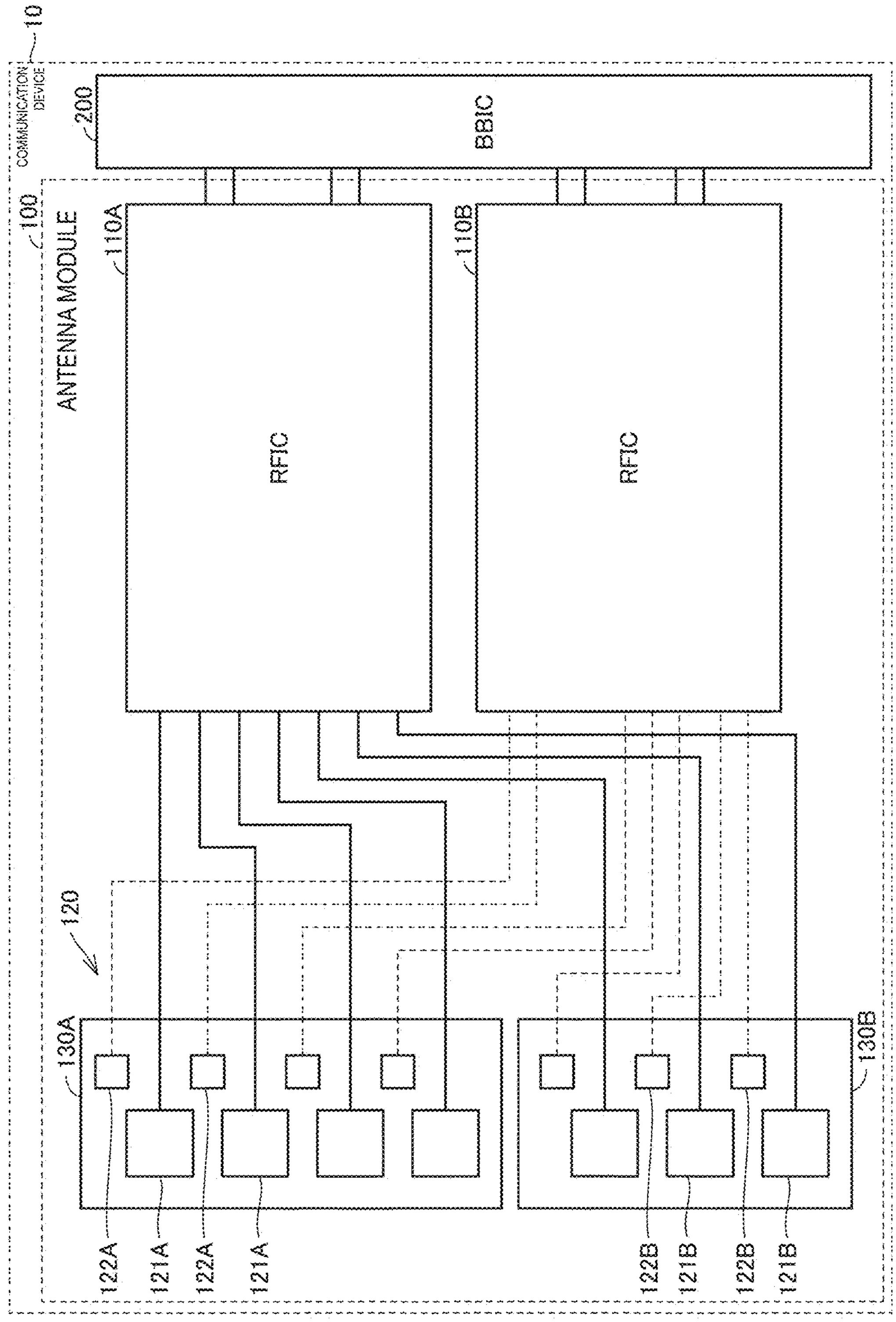
FIG. 1 is a block diagram of a communication device to which an antenna module according to an embodiment is applied.

In the following, an embodiment of the present disclosure will be described in detail with reference to the drawings. Note that identical or equivalent portions in the drawings are marked with the same symbols and description thereof is not repeated.

(Basic Configuration of Communication Device)

FIG. 1 is a block diagram of a communication device 10 to which an antenna module 100 according to the present embodiment is applied. The communication device 10 is, for example, a mobile terminal, such as a cellular phone, a smartphone, or a tablet, or a personal computer with communication functions. An example of the frequency band of radio waves used for the antenna module 100 according to the present embodiment is a millimeter wave band. Examples of the center frequency of the millimeter wave band are 28 GHz, 39 GHz, and 60 GHz. However, radio waves in frequency bands other than those described above are also applicable.

With reference to FIG. 1, the communication device 10 includes the antenna module 100 and a baseband integrated circuit (BBIC) 200 constituting a baseband signal processing circuit. The antenna module 100 includes radio frequency integrated circuits (RFICs) 110A and 110B, which are examples of a power feed circuit, and an antenna device 120. The communication device 10 up-converts signals transmitted from the BBIC 200 to the antenna module 100 into radio frequency signals and emits the radio frequency signals from the antenna device 120, and also down-converts radio frequency signals received by the antenna device 120 and processes the signals using the BBIC 200. Note that the RFICs 110A and 110B may be collectively called an "RFIC 110" in the following description.

The antenna device 120 includes two dielectric substrates 130A and 130B. A plurality of emitting elements are disposed on each dielectric substrate. More specifically, in the example illustrated in FIG. 1, an emitting element 121A and an emitting element 122A are disposed on a dielectric substrate 130A, the emitting elements 121A and 122A each including four electrodes. An emitting element 121B and an emitting element 122B are disposed on a dielectric substrate 130B, the emitting elements 121B and 122B each including three electrodes. Note that the number of emitting elements disposed on each dielectric substrate is not limited to the above-described number.

Each of the dielectric substrates 130A and 130B has a substantially rectangular shape. The plurality of electrodes of each of the emitting elements 121A and 122A are arranged in a row along the long side of the dielectric substrate 130A. The individual electrodes of the emitting elements 121B and 122B are arranged in a row along the long side of the dielectric substrate 130B.

In the present embodiment, each electrode of the emitting elements 121A, 122A, 121B, and 122B is a planar patch antenna having a substantially square shape. The electrode sizes of the emitting elements 121A and 121B (the lengths of the sides of the electrodes) are larger than those of the emitting elements 122A and 122B. Thus, the frequency bands of radio waves emitted from the individual electrodes of the emitting elements 121A and 121B are lower than those of radio waves emitted from the individual electrodes of the emitting elements 122A and 122B. That is, the antenna module 100 is a so-called dual-band antenna module capable of emitting radio waves of two different frequency bands. In the example in the present embodiment, the center frequency of radio waves emitted from the emitting elements 121A and 121B for the lower frequency band is 28 GHz, and the center frequency of radio waves emitted from the emitting elements 122A and 122B for the higher frequency band is 39 GHz.

To the emitting elements 121A and 121B for the lower frequency band, radio frequency signals are supplied from the RFIC 110A. In contrast, to the emitting elements 122A and 122B for the higher frequency band, radio frequency signals are supplied from the RFIC 110B.

Figure 2:
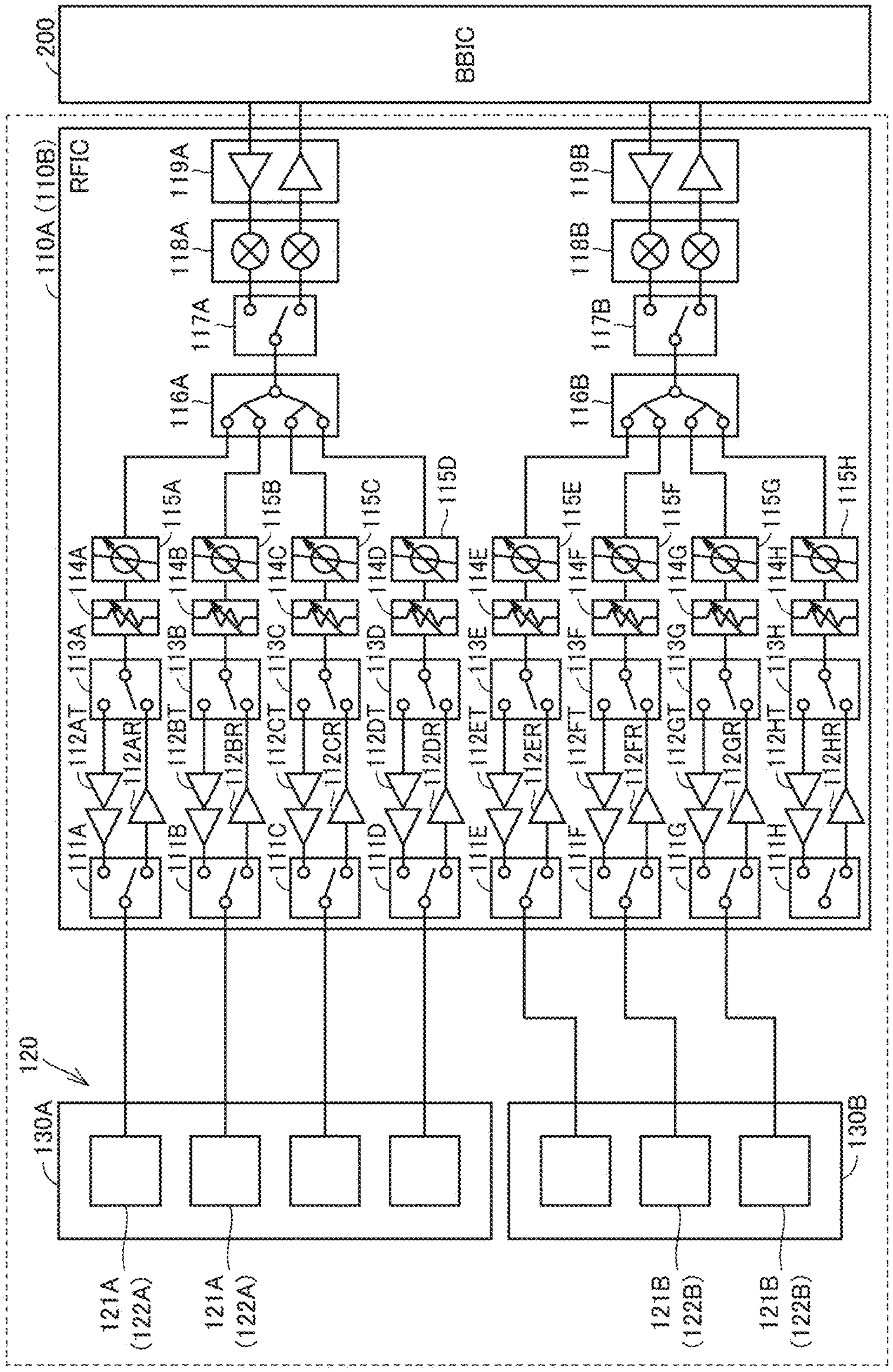
FIG. 2 is a diagram for describing a detailed configuration of RFICs of FIG. 1.

FIG. 2 is a diagram for describing a detailed configuration of the RFICs of FIG. 1.

Note that, in FIG. 2, description will be made using circuits for the lower frequency band (the emitting elements 121A and 121B and the RFIC 110A) as an example; however, circuits for the higher frequency band basically have substantially the same configuration.

With reference to FIG. 2, the RFIC 110A includes switches 111A to 111H, 113A to 113H, 117A, and 117B, power amplifiers 112AT to 112HT, low noise amplifiers 112AR to 112HR, attenuators 114A to 114H, phase sifters 115A to 115H, signal multiplexing/demultiplexing devices 116A and 116B, mixers 118A and 118B, and amplification circuits 119A and 119B. Among these, the configurations of the switches 111A to 111D, 113A to 113D, and 117A, the power amplifiers 112AT to 112DT, the low noise amplifiers 112AR to 112DR, the attenuators 114A to 114D, the phase sifters 115A to 115D, the signal multiplexing/demultiplexing device 116A, the mixer 118A, and the amplification circuit 119A are circuits for the emitting element 121A on the dielectric substrate 130A side. Moreover, the configurations of the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal multiplexing/demultiplexing device 116B, the mixer 118B, and the amplification circuit 119B are circuits for the emitting element 121B on the dielectric substrate 130B side. Note that, in the antenna module 100, the number of emitting elements 121B on the dielectric substrate 130B side is three, and thus an emitting element is not connected to a path connecting the switches 111H and 113H, the power amplifier 112HT, the low noise amplifier 112HR, the attenuator 114H, and the phase shifter 115H.

In a case where radio frequency signals are to be transmitted, the switches 111A to 111H and 113A to 113H are switched to the side where the power amplifiers 112AT to 112HT are provided, and also the switches 117A and 117B are connected to the transmission-side amplifiers of the amplification circuits 119A and 119B. In a case where radio frequency signals are to be received, the switches 111A to 111H and 113A to 113H are switched to the side where the low noise amplifiers 112AR to 112HR are provided, and also the switches 117A and 117B are connected to the reception-side amplifiers of the amplification circuits 119A and 119B.

Signals transmitted from the BBIC 200 are amplified by the amplification circuits 119A and 119B and are then up-converted by the mixers 118A and 118B. Transmission signals that are up-converted radio frequency signals are separated into four signals by the signal multiplexing/demultiplexing devices 116A and 116B, and the four signals pass through the corresponding signal paths and are fed to the emitting elements 121A and 121B. In this case, by separately adjusting the degrees of phase shift of the phase shifters 115A to 115H disposed in the respective signal paths, the directivity of the antenna device 120 can be adjusted. Moreover, the attenuators 114A to 114H adjust the strengths of transmission signals.

Reception signals, which are radio frequency signals received by the respective emitting elements 121A and 121B, are transmitted to the RFIC 110A, travel along the respective different signal paths, and are multiplexed by the signal multiplexing/demultiplexing devices 116A and 116B. The multiplexed reception signals are down-converted by the mixers 118A and 118B and are furthermore amplified by the amplification circuits 119A and 119B, and the resulting signals are transmitted to the BBIC 200.

The RFIC 110A is, for example, formed as a one-chip integrated circuit component including the above-described circuit configuration. Alternatively, the devices (the switches, the power amplifiers, the low noise amplifiers, the attenuators, the phase shifters) corresponding to the individual emitting elements 121A and 121B in the RFIC 110A may be formed as a one-chip integrated circuit component for each corresponding emitting element.

Note that FIGS. 1 and 2 illustrate the configuration for a case where radio waves having one polarization direction are emitted from the electrodes of the individual emitting elements. In the case of a so-called dual-polarization type antenna module capable of emitting radio waves in two different polarization directions from the electrodes of the individual emitting elements, an RFIC is further provided for each polarization and a radio frequency signal is supplied to each power supply point separately. Alternatively, a switching device may be provided between the RFIC and the emitting element and may supply the output from the RFIC to the power supply point for each polarization by switching the output.

Note that the "dielectric substrate 130A and dielectric substrate 130B" in the present embodiment correspond to a "first substrate" and a "second substrate" according to the present disclosure, respectively. The "emitting element 121A", the "emitting element 122A", the "emitting element 121B", and the "emitting element 122B" according to the embodiment correspond to a "first emitting element", a "second emitting element", a "third emitting element", and a "fourth emitting element" according to the present disclosure, respectively.

(Configuration of Antenna Module)

Figure 3:
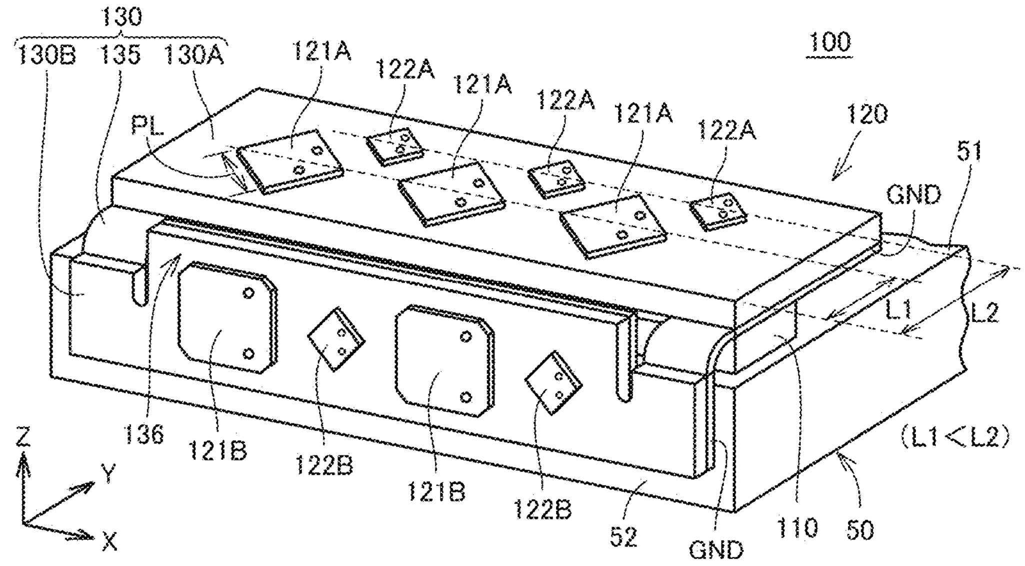
FIG. 3 is a perspective view of the antenna module according to the embodiment.

Next, with reference to FIG. 3, the configuration of the antenna module 100 according to the present embodiment will be described in detail. FIG. 3 is a perspective view of the antenna module 100.

The antenna module 100 includes the dielectric substrates 130A and 130B as described above, and is disposed on a mounting substrate 50, which is a substantially rectangular parallelepiped. Note that, in the following description, the normal direction of a main surface 51 of the mounting substrate 50 is the Z-axis, and the directions along two sides of the main surface 51 are the X-axis and Y-axis directions.

The dielectric substrates 130A and 130B are, for example, low temperature co-fired ceramic (LTCC) multilayer substrates, multilayer resin substrates formed by laminating a plurality of resin layers consisting of epoxy, polyimide, and other resins, multilayer resin substrates formed by laminating a plurality of resin layers consisting of liquid crystal polymers (LCPs) having lower dielectric constants, multilayer resin substrates formed by laminating a plurality of resin layers consisting of fluorine-based resins, or multilayer ceramic substrates other than LTCC multilayer substrates. Note that the dielectric substrates 130A and 130B do not have to have multilayer structures and may be single-layer substrates.

Each of the dielectric substrates 130A and 130B has a flat plate-like shape extending schematically in the X-axis direction. The dielectric substrate 130A and the dielectric substrate 130B are disposed such that their normal directions are different from each other. Specifically, the dielectric substrate 130A is disposed such that its normal direction matches the Z-axis direction, and the dielectric substrate 130B is disposed such that its normal direction matches the Y-axis direction. In other words, the dielectric substrate 130A is disposed so as to face the main surface 51 of the mounting substrate 50, and the dielectric substrate 130B is disposed so as to face a side surface 52 of the mounting substrate 50 along the X-axis. The RFIC 110 is disposed between the dielectric substrate 130A and the mounting substrate 50.

The dielectric substrate 130A and the dielectric substrate 130B are connected to each other by connection members 135. In the antenna module 100, the dielectric substrates 130A and 130B are almost equal in length in the X-axis direction, and the connection members 135 are formed at least both end portions of each dielectric substrate. Note that a connection member 135 may also be formed at middle portions of the dielectric substrates in the X-axis direction. Dielectric substrate torsion can be suppressed by connecting the end portions of the dielectric substrates to each other. When viewed in a plan view from the X-axis direction, the antenna device 120 is formed in a substantially L shape by the dielectric substrates 130A and 130B and the connection members 135.

A ground electrode GND is disposed over the entire surface of the side (back side) of the dielectric substrate 130A that faces the mounting substrate 50. The ground electrode GND extends from the dielectric substrate 130A through the connection members 135 to the dielectric substrate 130B.

The dielectric substrate 130A has a substantially rectangular shape when viewed in a plan view from its normal direction (the Z-axis direction). On the dielectric substrate 130A, three electrodes of the emitting element 121A are disposed along the X-axis direction. Moreover, on the dielectric substrate 130A, three electrodes of the emitting element 122A are disposed along the X-axis direction. The electrodes of the emitting element 121A and the electrodes of the emitting element 122A are disposed adjacent to each other along the X-axis direction in an alternating manner. Note that, in FIG. 3, the example is illustrated in which each electrode of the emitting elements 121A and 122A is exposed on the surface of the dielectric substrate 130A; however, each electrode of the emitting elements 121A and 122A may be disposed in or on an inner layer of the dielectric substrate 130A.

Each electrode of the emitting element 121A is arranged diagonally so that each side of the electrode forms 45° with respect to the X-axis direction. Each electrode of the emitting element 121A is disposed at the position where the distance from an end surface of the dielectric substrate 130A (that is, an end surface of the ground electrode GND) on the dielectric substrate 130B side to the center of the electrode of the emitting element 121A is L1. Note that, preferably, the distance L1 from the end portion of the dielectric substrate 130A is L1<PL in a case where the electrode size of the emitting element 121A is PL.

Similarly, each electrode of the emitting element 122A is disposed diagonally so that each side of the electrode forms 45° with respect to the X-axis direction. Each electrode of the emitting element 122A is disposed at the position where the distance from the end surface of the dielectric substrate 130A on the dielectric substrate 130B side to the center of the electrode of the emitting element 122A is L2.

In this case, the distance L1 from the end portion of the dielectric substrate 130A is shorter than the distance L2. That is, the emitting element 121A is disposed at a position that is closer to the dielectric substrate 130B than the emitting element 122A is.

In each electrode of the emitting elements 121A and 122A, radio frequency signals are supplied from the RFIC 110 to two power supply points. The power supply points of each electrode are positioned at 45° and −45° with respect to the direction parallel to the X-axis through the center of the electrode. As a result, radio waves with a polarization direction at 45° with respect to the X-axis direction and radio waves with a polarization direction at 45° with respect to the Y-axis direction are emitted from each electrode of the emitting elements 121A and 122A.

When viewed in a plan view from the normal direction (the Y-axis direction), the dielectric substrate 130B has a substantially rectangular shape with notches formed at portions corresponding to the connection members 135. The dielectric substrate 130B has a protrusion 136 formed at the portion where the above-described notches are not formed, the protrusion 136 protruding in the Z-axis direction. In the region of the protrusion 136 of the dielectric substrate 130B, two electrodes of the emitting element 121B and two electrodes of the emitting element 122B are disposed along the X-axis direction. The electrodes of the emitting elements 121B and the electrodes of the emitting elements 122B are disposed along the X-axis direction in an alternating manner. Note that, in FIG. 3, the example is illustrated in which the emitting elements 121B and 122B are also exposed on the surface of the dielectric substrate 130B; however, the emitting elements 121B and 122B may be disposed in or on an inner layer of the dielectric substrate 130B.

Note that, although not illustrated in the drawing, radio frequency signals are supplied from the RFIC 110 to the emitting elements 121B and 122B through power feed lines that extend from the dielectric substrate 130A through the connection members 135 to the dielectric substrate 130B.

Each electrode of the emitting element 122B is arranged diagonally so that each side of the electrode is at 45° with respect to the X-axis direction. In each electrode of the emitting element 122B, radio frequency signals from the RFIC 110 are supplied to the two power supply points. The power supply points of each electrode of the emitting element 122B are positioned at 45° and −45° with respect to the direction parallel to the X-axis through the center of the electrode. As a result, radio waves with a polarization direction at 45° with respect to the X-axis direction and radio waves with polarization at 45° with respect to the Z-axis direction are emitted from each electrode of the emitting element 122B.

In contrast, when viewed in a plan view from the normal direction (the Y-axis direction) of the dielectric substrate 130B, each electrode of the emitting element 121B has a substantially octagonal shape. This is because the size of the dielectric substrate 130B in the Z-axis direction is limited, and thus similarly to the emitting element 122B, the electrode is arranged at a 45° tilt in a state where four corners of the electrode, which has a square shape, are cut out. Even regarding each electrode of the emitting element 121B, the power supply points of the electrode are positioned at 45° and −45° with respect to the direction parallel to the X-axis through the center of the electrode. As a result, radio waves with a polarization direction at 450 with respect to the X-axis direction and radio waves with a polarization direction at 450 with respect to the Z-axis direction are emitted also from each electrode of the emitting element 121B.

(Directivity)

In the case of a patch antenna having a flat plate-like shape as described above, the direction of emission of radio waves from each emitting element is basically the normal direction of the emitting element. However, in a case where a sufficiently large area of a ground electrode disposed so as to face the emitting elements cannot be ensured, the direction of emission (directivity) of radio waves may be tilted from the normal direction. More specifically, in a case where the area of the ground electrode on one side of an emitting element is larger than that of the ground electrode on another side of the emitting element, the direction of emission tends to be tilted toward the side where the ground electrode is larger. This is because, at the end portion of the ground electrode on the side where the area of the ground electrode is smaller, some of lines of electric force generated between the emitting element and the ground electrode enter the back side of the ground electrode, so that the gain decreases in the normal direction compared with the side where the area of the ground electrode is larger.

As in the antenna module 100 according to the embodiment, in a case where the antenna module has an L shape, assuming the directivities of radio waves from the emitting elements of the dielectric substrate 130A are tilted toward the dielectric substrate 130B side, the number of radio waves emitted toward the opposite side from the dielectric substrate 130B is reduced, thereby resulting in a narrower possible emission range for the entire antenna module. In the antenna module 100 according to the present embodiment, the emitting element 121A for the lower frequency band is disposed at a position that is closer to the dielectric substrate 130B than the emitting element 122A for the higher frequency band is. Thus, the distance between the emitting element 121A and an end portion of the ground electrode GND on the negative direction side of the Y-axis is shorter than the distance between the emitting element 121A and an end portion of the ground electrode GND on the positive direction side of the Y-axis. Thus, the direction of emission of radio waves emitted from the emitting element 121A is tilted toward the positive direction side of the Y-axis from the normal direction of the dielectric substrate 130A. Therefore, regarding radio waves of the lower frequency band, the emission range of the entire antenna module can be increased.

Note that, in this case, regarding the emitting element 122A for the higher frequency band, the area of the ground electrode GND on the dielectric substrate 130B side is conversely increased. However, the electrode size of the emitting element 121A disposed adjacent to the emitting element 122A is larger than that of the emitting element 122A. Thus, for the emitting element 122A, the emitting element 121A can function as a shielding wall that impedes lines of electrical force. Thus, when viewed from the emitting element 122A, the substantial area of the ground electrode GND on the dielectric substrate 130B side is smaller than it actually is, and the tilt of the direction of emission of radio waves emitted from the emitting element 122A toward the negative direction side of the Y-axis becomes small accordingly. Therefore, the effect on directivity due to the emitting element 122A being disposed at a position that is farther from the dielectric substrate 130B is relatively small.

Figure 4:
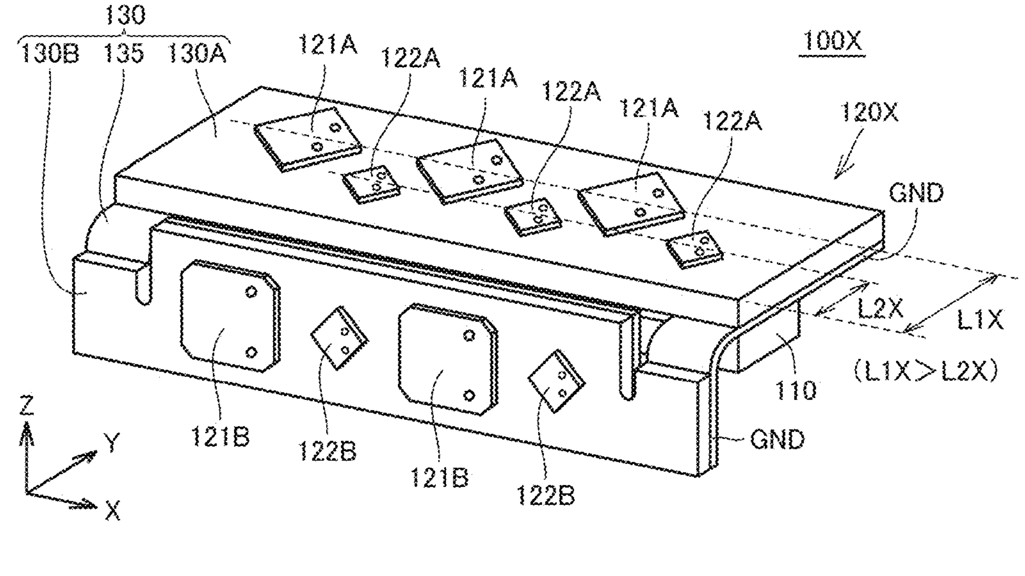
FIG. 4 is a perspective view of an antenna module according to a comparative example.

Next, the directivity of the antenna module 100 will be described using a comparative example. FIG. 4 is a perspective view of an antenna module 100X according to the comparative example. In an antenna device 120X of the antenna module 100X, the arrangement of the emitting element 121A and the emitting element 122A on the dielectric substrate 130A is flipped relative to that on the antenna module 100. In other words, the emitting element 121A is disposed at a position that is farther from the dielectric substrate 130B than the emitting element 122A is. That is, a distance L1X from the end surface of the dielectric substrate 130A on the dielectric substrate 130B side to the center of each electrode of the emitting element 121A is longer than a distance L2X from the end surface of the dielectric substrate 130A on the dielectric substrate 130B side to the center of each electrode of the emitting element 122A.

Figure 5:
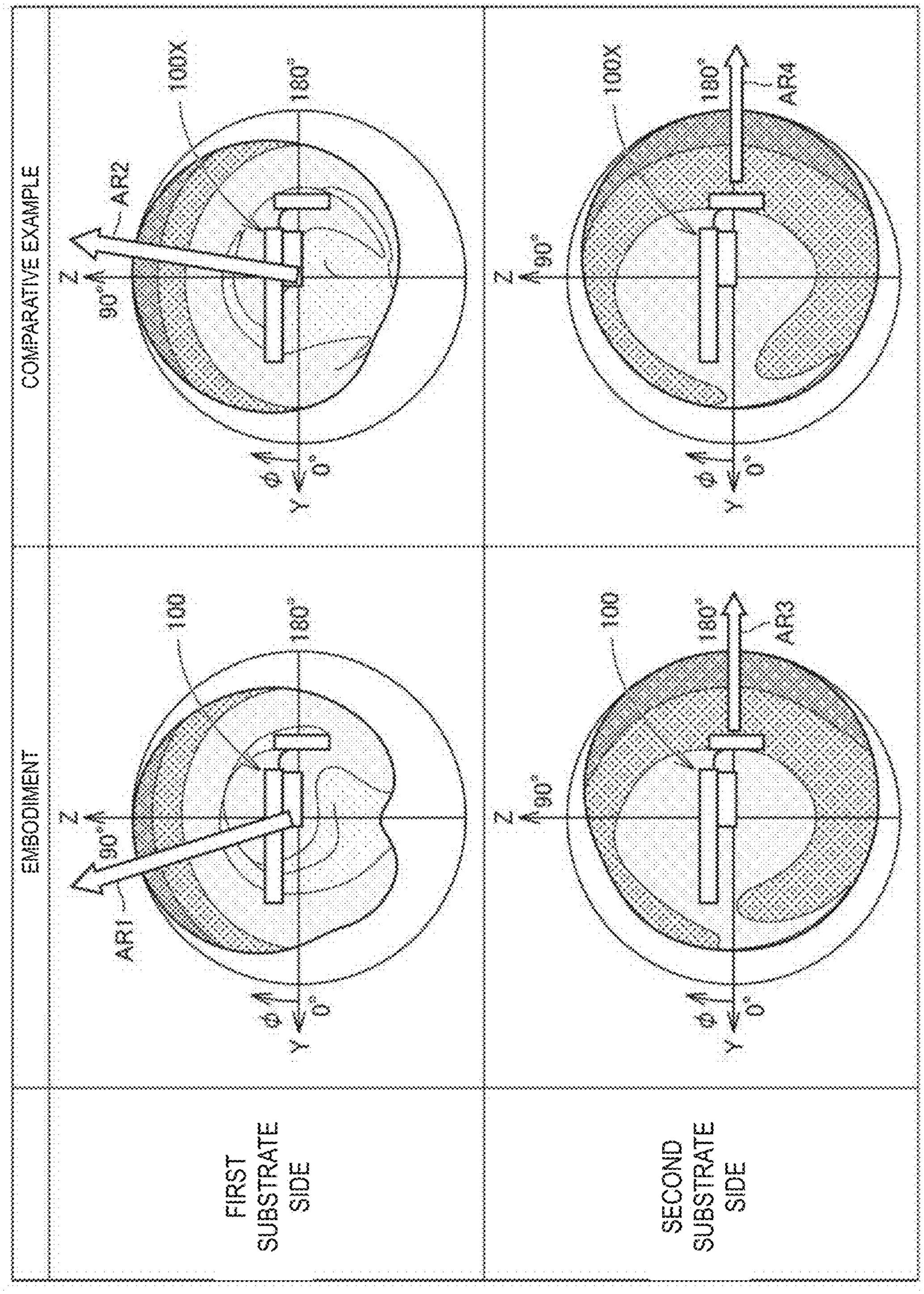
FIG. 5 illustrates first diagrams for describing the directivities of the antenna modules according to the embodiment and comparative example.

FIG. 5 illustrates cross sections of the distributions of antenna gain when viewed from the negative direction of the X-axis for the emitting elements 121A for the lower frequency band (28 GHz) in the antenna module 100 according to the embodiment and the antenna module 100X according to the comparative example. In FIG. 5, the top row illustrates the antenna gains of the emitting elements 121A on the dielectric substrate 130A (the first substrate) side, and the bottom row illustrates the antenna gains of the emitting elements 121B on the dielectric substrate 130B (the second substrate) side. Note that, in each drawing, the antenna gain increases as the density of the hatch becomes denser.

With reference to FIG. 5, regarding the radio waves emitted from the emitting element 121A of the dielectric substrate 130A in the antenna module 100X of the comparative example, the antenna gain increases in the direction of an arrow AR2. The direction of the arrow AR2 (directivity) is tilted from the normal direction of the dielectric substrate 130A (the Z-axis direction: $\varphi=90°$) toward the dielectric substrate 130B side, namely the direction for $\varphi>90°$. In contrast, in the antenna module 100 according to the embodiment, the antenna gain increases toward the direction of an arrow AR1, and the directivity is tilted toward the direction for $\varphi<90°$.

Note that, both in the embodiment and the comparative example, the direction of emission of radio waves emitted from the emitting element 121B of the dielectric substrate 130B is the negative direction of the Y-axis (arrows AR3 and AR4: $\varphi=180°$). That is, the effect on directivity due to disposition of the emitting elements on the dielectric substrate 130A side is small.

Figure 6:
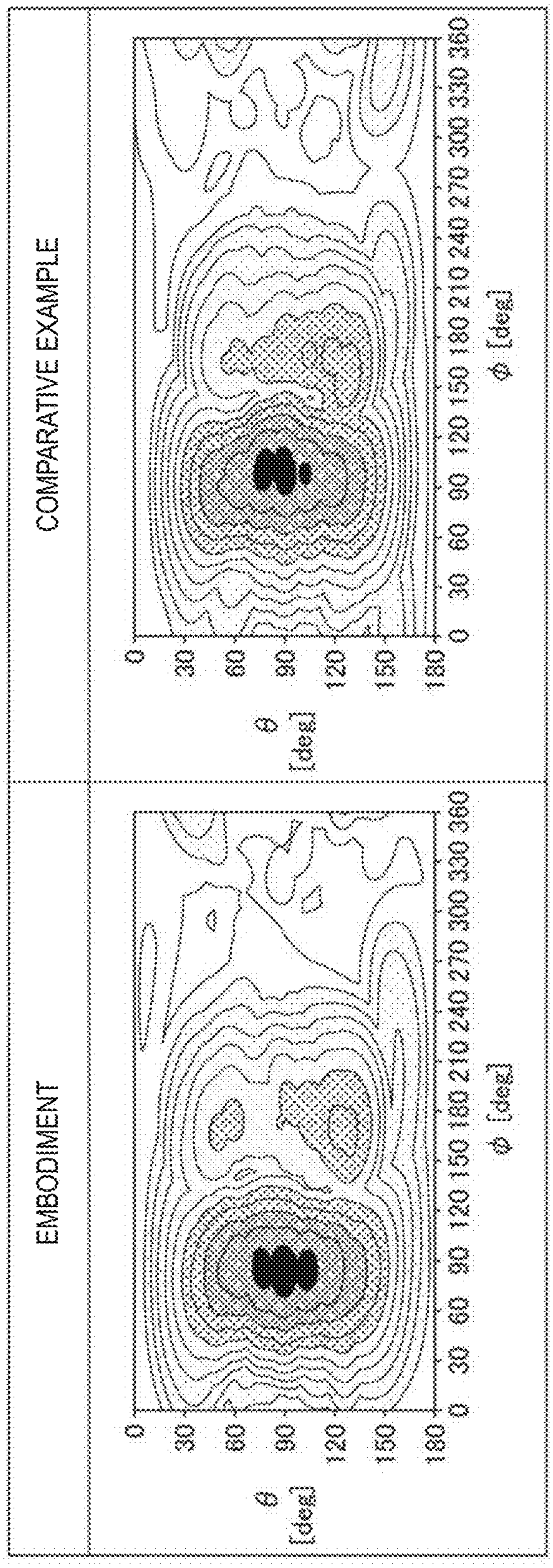
FIG. 6 illustrates second diagrams for describing the directivities of the antenna modules according to the embodiment and comparative example.

FIG. 6 includes diagrams illustrating, in a planar manner, the spherical distributions of antenna gain. More specifically, the vertical axis represents angle $\theta$ around the Y-axis, namely position in the X-axis direction, and the horizontal axis represents angle $\varphi$ around the X-axis illustrated in FIG. 5. In FIG. 6, $\varphi=90°$ indicates the normal direction of the dielectric substrate 130A (the Z-axis direction), and $\varphi=180°$ indicates the normal direction of the dielectric substrate 130B (the Y-axis direction). Even in FIG. 6, the antenna gain increases as the density of the hatch becomes denser.

With reference to FIG. 6, in the antenna module 100X of the comparative example, assuming the distribution of gain on the dielectric substrate 130A is viewed, the peak position of the gain is between $\varphi=90°$ to 120°. In contrast, in the antenna module 100 according to the embodiment, the peak position of the gain is between $\varphi=60°$ to 90°.

Moreover, assuming the comparative example is compared with the embodiment, the gain near $\varphi=120°$ to 150° corresponding to the region between the dielectric substrate 130A and the dielectric substrate 130B is higher in the comparative example, and this indicates that the radio waves emitted from the dielectric substrate 130A are overall biased toward the dielectric substrate 130B side. In other words, when compared with the comparative example, the radio waves emitted from the dielectric substrate 130A are biased toward the opposite side from the dielectric substrate 130B in the antenna module 100 according to the embodiment, and the possible emission range is increased for the entire antenna module.

Figure 7:
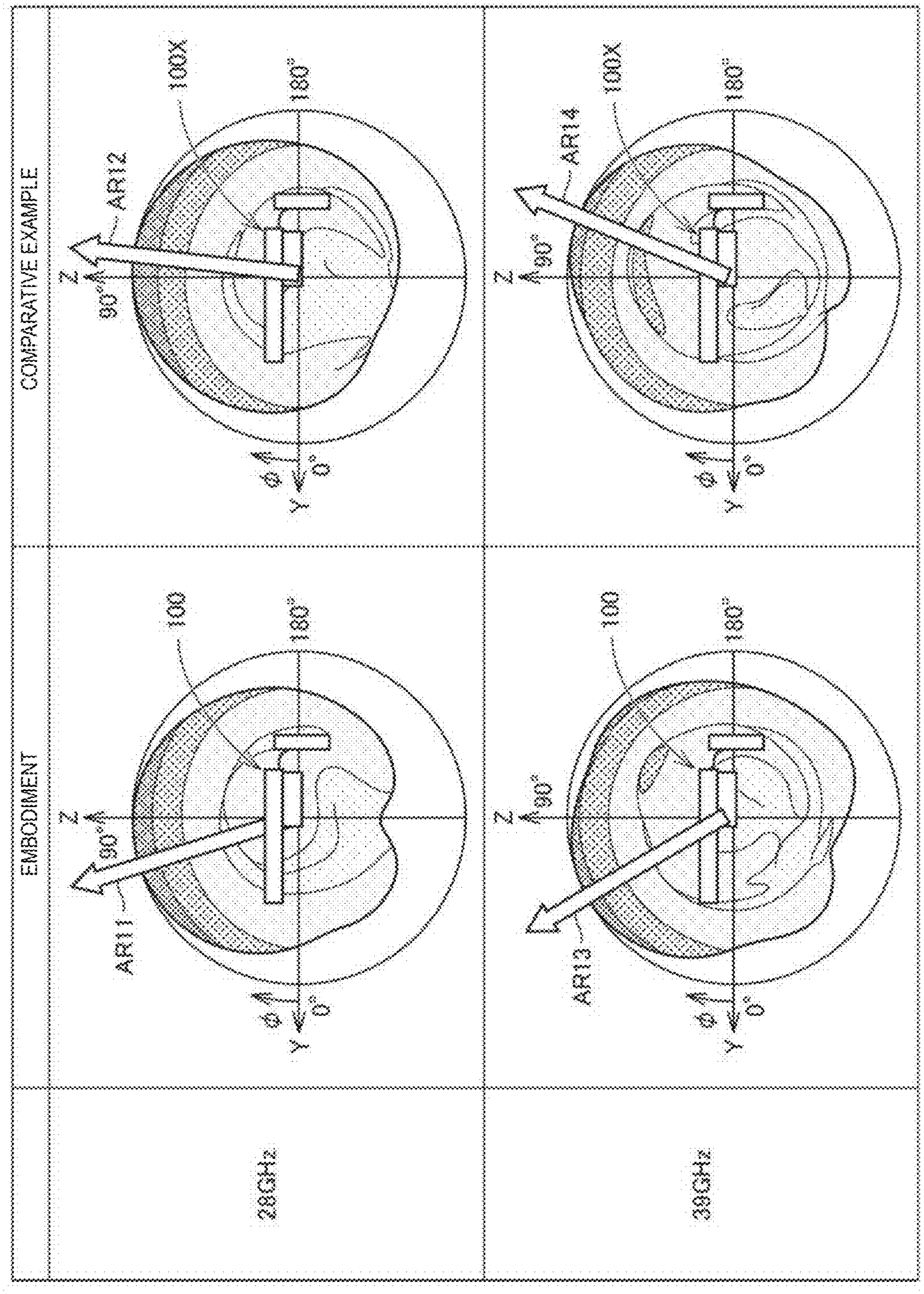
FIG. 7 is a diagram for describing directivities based on frequency bands.

FIG. 7 is a diagram for describing directivities based on frequency bands for the antenna modules according to the comparative example and the embodiment. FIG. 7 illustrates cross sections of the distributions of antenna gain when viewed from the negative direction of the X-axis, similarly to as in FIG. 5. In FIG. 7, the top row illustrates the distributions of gain of the emitting elements 121A for the lower frequency band (28 GHz), and the bottom row illustrates the distributions of gain of the emitting elements 122A for the higher frequency band (39 GHz).

With reference to FIG. 7, the distributions of gain for the lower frequency band are similar to those described for FIG. 5. In the comparative example, the directivity is tilted toward the negative direction of the Y-axis from the normal direction (the Z-axis direction) as indicated by an arrow AR12. In the embodiment, the directivity is tilted toward the positive direction of the Y-axis as indicated by an arrow AR11. Moreover, even in the distributions of gain for the higher frequency band, the directivity is tilted toward the negative direction of the Y-axis (an arrow AR14) from the normal direction in the comparative example, and the directivity is tilted toward the positive direction of the Y-axis (an arrow AR13) in the embodiment.

As described above, regarding the emitting elements 122A for the higher frequency band, the adjacent emitting elements 121A function as shielding walls. As a result, when viewed from the emitting elements 122A, the areas of the ground electrodes GND in the opposite directions from the emitting elements 121A become substantially larger, and the emitting elements 122A for the higher frequency band indicate similar trends to the emitting elements 121A for the lower frequency band.

Note that the electrode size of the emitting elements 122A for the higher frequency band is smaller than that of the emitting elements 121A for the lower frequency band, and the gaps between the adjacent electrodes are relatively large, and thus the emitting elements 122A are less effective as shielding walls for the emitting elements 121A.

As described above, by disposing the emitting elements disposed on the dielectric substrate 130A such that the emitting element 121A for the lower frequency band is disposed at a position that is closer to the dielectric substrate 130B than the emitting element 122A for the higher frequency band is as in the antenna module 100 according to the embodiment, both the directivity of the emitting element 121A for the lower frequency band and that of the emitting element 122A for the higher frequency band can be tilted toward the opposite direction from the dielectric substrate 130B. This can increase the possible emission range of the entire antenna module.

Note that the configuration of the antenna module 100 according to the embodiment has been described in which the emitting elements 121B and 122B are separately disposed on the dielectric substrate 130B; however, the antenna module 100 according to the embodiment may have a stacking structure in which the electrodes of the emitting element 121B and the electrodes of the emitting element 122B are stacked in the normal direction (the Y-axis direction).

(Modification)

In the above-described embodiment, the case of a dual-band antenna module has been described. In a modification, the case of a single-band antenna module will be described in which one type of radio waves is emitted from an emitting element on each dielectric substrate.

Figure 8:
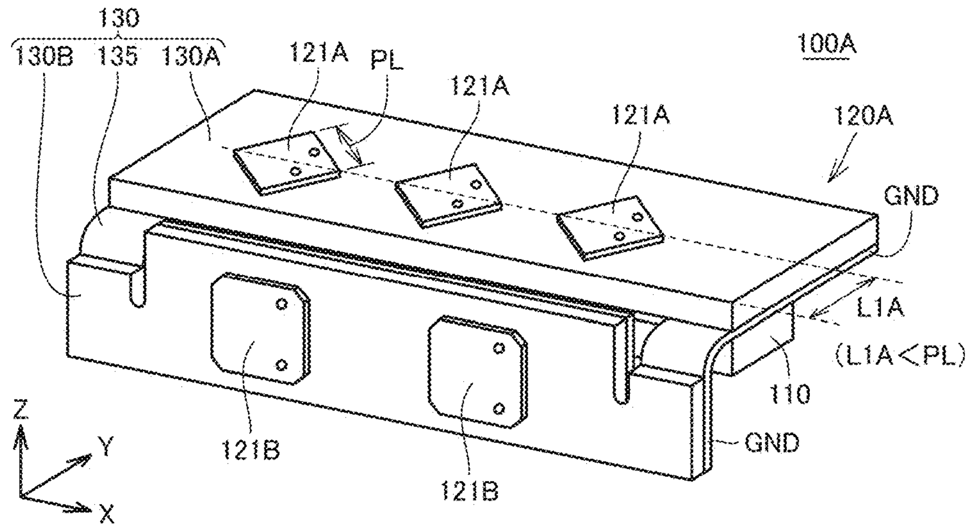
FIG. 8 is a perspective view of an antenna module according to a modification.

FIG. 8 is a perspective view of an antenna module 100A according to the modification. In an antenna device 120A of the antenna module 100A, the emitting element 121A is disposed on the dielectric substrate 130A, and the emitting element 121B is disposed on the dielectric substrate 130B. In this case, in a case where the electrode size of the emitting element 121A disposed on the dielectric substrate 130A is PL, the emitting element 121A is disposed at a position at which a distance L1A from an end surface of the dielectric substrate 130A on the dielectric substrate 130B side to the center of each electrode of the emitting element 121A is shorter than the electrode size PL.

In this manner, emission toward the direction of the dielectric substrate 130B can be minimized by disposing the emitting element closer to the end surface of the ground electrode GND than the electrode size, and thus the directivity of radio waves emitted from the emitting element 121A can be tilted toward the opposite direction from the dielectric substrate 130B. This can increase the possible emission range of the entire antenna module.

Note that the "emitting element 121A" and the "emitting element 121B" in the modification correspond to a "fifth emitting element" and a "sixth emitting element" according to the present disclosure, respectively.

In the antenna modules 100 and 100A, the polarization direction of radio waves emitted from each electrode of the emitting elements is tilted at 45° with respect to the coordinate axis in the drawing (for example, the X-axis); however, the tilt of the polarization direction is not limited to this and may be any angle greater than 0° and smaller than 90°.

Note that, in the above-described embodiment and modification, the configurations have been described in which the emitting elements 121 and 122 are separately disposed on the dielectric substrates; however, a configuration may be used in which a third emitting element corresponding to a frequency band (for example, 60 GHz) different from those of the emitting elements 121 and 122 is stacked on the emitting element 121 or the emitting element 122.

In the above-described embodiment and modification, the case where the emitting elements are patch antennas has been described; however, the features of the present disclosure are also applicable to other types of antennas having flat plate-like shapes with opposing grounding electrodes such as planar inverted-F antennas (PIFAs: Planar Inverted F Antennas) or dielectric resonator antennas (DRAs).

The embodiments disclosed this time are to be considered exemplary and not restrictive in all respects. The scope of the present disclosure is indicated by the claims, not by the description of the embodiments above, and is intended to include all changes within the meaning and scope of the claims and those of equivalents of the claims.

REFERENCE SIGNS LIST

10 communication device
50 mounting substrate
51 main surface
52 side surface
100, 100A, 100X antenna module
110, 110A, 110B RFIC
111A to 111H, 113A to 113H, 117A, 117B switch
112AR to 112HR low noise amplifier
112AT to 112HT power amplifier
114A to 114H attenuator
115A to 115H phase shifter
116A, 116B signal multiplexing/demultiplexing device
118A, 118B mixer
119A, 119B amplification circuit
120, 120A, 120X antenna device
121A, 121B, 122A, 122B emitting element
130A, 130B dielectric substrate
135 connection member
136 protrusion
200 BBIC
GND ground electrode

The invention claimed is:

1. An antenna module comprising:

a first substrate and a second substrate, whose normal directions are different from each other;

a first emitting element capable of emitting radio waves of a first frequency band, the first emitting element being disposed on the first substrate;

a second emitting element capable of emitting radio waves of a second frequency band higher than the first frequency band, the second emitting element being disposed adjacent to the first emitting element on the first substrate;

a ground electrode disposed on the first substrate so as to face the first emitting element and the second emitting element; and a third emitting element disposed on the second substrate, wherein on the first substrate, the first emitting element is disposed at a position that is closer to the second substrate than the second emitting element is, and a distance from a center of the first emitting element to an end surface of the ground electrode that is closer to the second substrate is shorter than a distance from the center of the first emitting element to an end surface of the ground electrode that is farther from the second substrate.

2. The antenna module according to claim 1, wherein the first emitting element and the second emitting element are planar electrodes having rectangular shapes, and the distance from the center of the first emitting element to the end surface of the ground electrode that is closer to the second substrate is shorter than a length of a side of an electrode of the first emitting element.

3. The antenna module according to claim 2, further comprising: a connection member that connects the first substrate and the second substrate.

4. The antenna module according to claim 3, wherein each of the first emitting element and the second emitting element includes a plurality of electrodes arranged in a direction along the second substrate.

5. The antenna module according to claim 4, wherein the electrodes of the first emitting element and the electrodes of the second emitting element are disposed in an alternating manner in the direction along the second substrate.

6. The antenna module according to claim 5, further comprising: a fourth emitting element disposed on the second substrate, wherein the third emitting element is capable of emitting radio waves of the first frequency band, and the fourth emitting element is capable of emitting radio waves of the second frequency band.

7. The antenna module according to claim 6, wherein in a case where the second substrate is viewed in a plan view from a normal direction, the third emitting element and the fourth emitting element overlap each other.

8. The antenna module according to claim 6, wherein in a case where the second substrate is viewed in a plan view from a normal direction, the third emitting element and the fourth emitting element are disposed adjacent to each other.

9. The antenna module according to claim 8, wherein each of the third emitting element and the fourth emitting element includes a plurality of electrodes arranged in a direction along the first substrate.

10. The antenna module according to claim 9, wherein the electrodes of the third emitting element and the electrodes of the fourth emitting element are disposed in an alternating manner in the direction along the first substrate.

11. The antenna module according to claim 1, further comprising: a power feed circuit that is disposed on the first substrate and is configured to supply a radio frequency signal to each emitting element.

12. A communication device comprising: the antenna module according to claim 1.

13. The antenna module according to claim 1, further comprising: a connection member that connects the first substrate and the second substrate.

14. The antenna module according to claim 13, wherein each of the first emitting element and the second emitting element includes a plurality of electrodes arranged in a direction along the second substrate.

15. The antenna module according to claim 14, wherein the electrodes of the first emitting element and the electrodes of the second emitting element are disposed in an alternating manner in the direction along the second substrate.

16. The antenna module according to claim 15, further comprising: a fourth emitting element disposed on the second substrate, wherein the third emitting element is capable of emitting radio waves of the first frequency band, and the fourth emitting element is capable of emitting radio waves of the second frequency band.

17. The antenna module according to claim 16, wherein in a case where the second substrate is viewed in a plan view from a normal direction, the third emitting element and the fourth emitting element overlap each other, or wherein in a case where the second substrate is viewed in a plan view from a normal direction, the third emitting element and the fourth emitting element are disposed adjacent to each other.

18. An antenna module comprising:

a first substrate and a second substrate, whose normal directions are different from each other;

an emitting element disposed on the first substrate and having a flat plate-like shape;

a ground electrode disposed on the first substrate so as to face the fifth emitting element; and another emitting element disposed on the second substrate and having a flat plate-like shape, wherein on the first substrate, a distance from a center of the emitting element to an end surface of the ground electrode that is closer to the second substrate is shorter than a length of a side of an electrode of the emitting element and is shorter than a distance from the center of the emitting element to an end surface of the ground electrode that is farther from the second substrate.

19. The antenna module according to claim 18, further comprising: a power feed circuit that is disposed on the first substrate and is configured to supply a radio frequency signal to each emitting element.

20. A communication device comprising: the antenna module according to claim 18.

* * * * *